(12) United States Patent
Barsook et al.

(10) Patent No.: US 9,569,533 B2
(45) Date of Patent: *Feb. 14, 2017

(54) SYSTEM AND METHOD FOR VISUAL SEARCH IN A VIDEO MEDIA PLAYER

(71) Applicant: Disney Enterprises, Inc., Burbank, CA (US)

(72) Inventors: Jonathan Barsook, Studio City, CA (US); Joven Matias, Pasadena, CA (US); Cyrus Hoomani, Studio City, CA (US); Arun Ramagopal, Studio City, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/846,455

(22) Filed: Sep. 4, 2015

(65) Prior Publication Data

US 2016/0063104 A1    Mar. 3, 2016

Related U.S. Application Data

(63) Continuation of application No. 13/535,133, filed on Jun. 27, 2012, now Pat. No. 9,165,070, which is a (Continued)

(51) Int. Cl.
*G06F 17/30* (2006.01)
*G06F 3/0482* (2013.01)
*G06F 3/0484* (2013.01)

(52) U.S. Cl.
CPC ....... *G06F 17/30849* (2013.01); *G06F 3/0482* (2013.01); *G06F 3/04842* (2013.01); (Continued)

(58) Field of Classification Search
CPC ................ G06F 17/30796; G06F 17/30817; G06F 17/30787; G06F 17/30802; G06F 17/30811; G06F 17/30696; G06F 17/30781; G06F 17/3079; G06F 17/30831; G06F 17/30047; G06F 17/30793; G06F 17/30799; G06F 17/30805; G06F 17/30808; G06K 9/00201; G06K 9/00295; G06K 9/00711; G06K 9/00751; G06K 9/00771
(Continued)

(56) References Cited

U.S. PATENT DOCUMENTS

| 2006/0153542 | A1* | 7/2006 | Chun | G11B 19/025 386/241 |
| 2009/0279843 | A1* | 11/2009 | Wang | G06F 17/3028 386/278 |
| 2010/0070523 | A1* | 3/2010 | Delgo | G06F 17/3079 707/769 |

* cited by examiner

*Primary Examiner* — Dennis Truong
(74) *Attorney, Agent, or Firm* — Farjami & Farjami LLP

(57) ABSTRACT

There is provided a system and method for visual search in a video media player. There is provided a computing device for performing a visual search in video files comprising a display, a memory, a video media player application in the memory, and a processor configured to store into the memory search terms by allowing a user to visually select objects as search terms using a user interface on the display, initiate a search using the search terms, obtain search results comprising time offsets and play durations within the video files, each play duration containing at least one frame corresponding to the search terms, and display navigational controls in the user interface for presenting the search results, including selectable graphical thumbnail images or preview videos. A user can select objects via outlined, highlighted, or otherwise visually identified objects in a video frame, the selecting enabled by associated search metadata.

10 Claims, 5 Drawing Sheets

Related U.S. Application Data continuation of application No. 12/284,633, filed on Sep. 23, 2008, now Pat. No. 8,239,359.

(52) U.S. Cl.
CPC ...... *G06F 17/3079* (2013.01); *G06F 17/3082* (2013.01); *G06F 17/3084* (2013.01); *G06F 17/30554* (2013.01); *G06F 17/30817* (2013.01); *G06F 17/30831* (2013.01); *G06F 17/30852* (2013.01); *G06F 17/30867* (2013.01); *Y10S 707/914* (2013.01)

(58) Field of Classification Search
USPC .......... 707/706, 707, 914, 999.002; 386/239, 386/103, 118
See application file for complete search history.

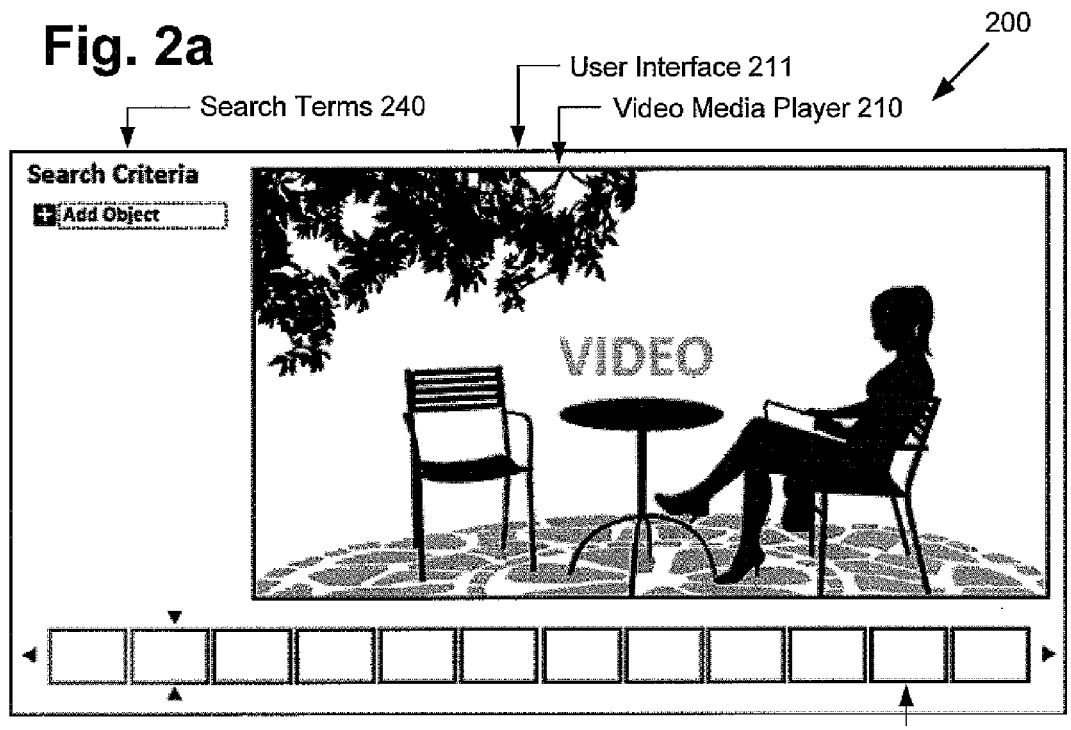
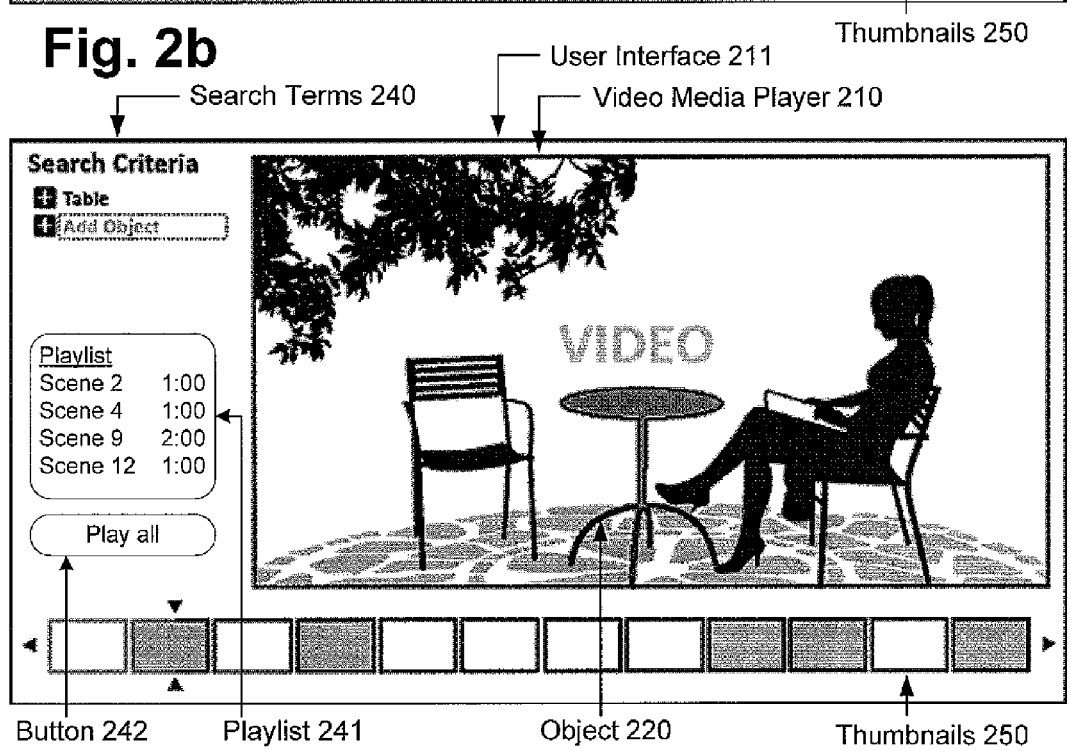

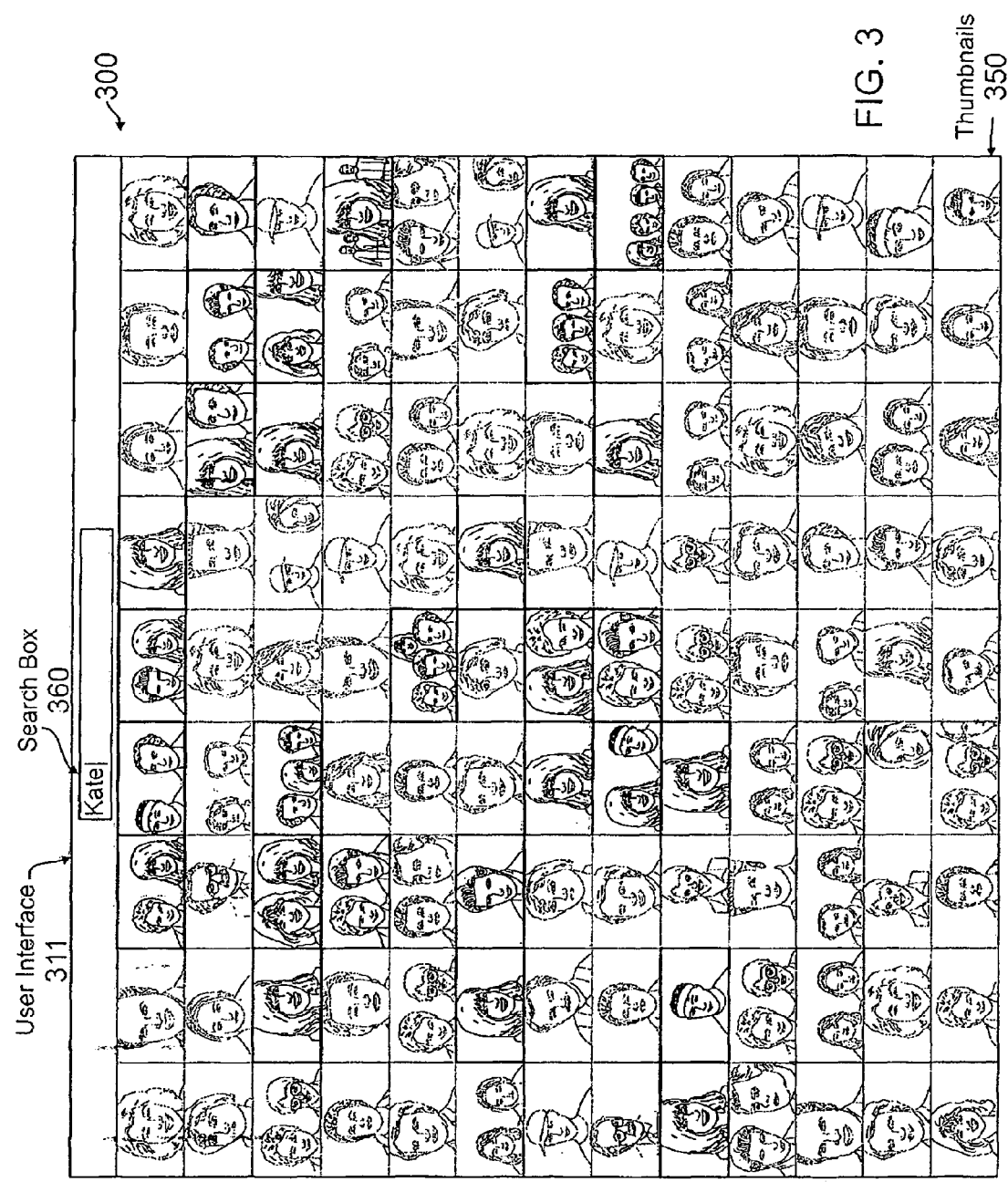

SYSTEM AND METHOD FOR VISUAL SEARCH IN A VIDEO MEDIA PLAYER

This application is a Continuation of U.S. patent application Ser. No. 13/535,133, filed on Jun. 27, 2012, which is a Continuation of U.S. patent application Ser. No. 12/284,633, filed on Sep. 23, 2008.

BACKGROUND OF THE INVENTION

1. Field of the Invention

The present invention relates generally to computer systems. More particularly, the present invention relates to systems for processing of computer data.

2. Background Art

With the vast selection of entertainment media and web sites currently available, competing for the attention of the video media viewer is now a daunting task. Although traditional written means of guidance for entertainment media selection such as reviews, episode guides, and summaries might suffice if the video media viewer is sufficiently motivated to conduct the required research, many others may be intimidated by the amount of effort required, even abandoning the whole enterprise of watching the video media in the first place. To make optimal use of limited leisure time, the video media viewer demands easy, instant access to media content that is custom tailored to the viewer's tastes and interests. Traditional entertainment delivery paradigms have so far largely failed to satisfy this demand, putting the onus of content selection on the viewer, often with limited guiding tools or assistance.

Even on-demand media delivery systems, such as Internet streaming video, suffer from a lack of tools facilitating easy selection of media content. For example, a television drama might have several episodes spanning several seasons, maybe even hundreds of episodes for particularly long running programs. Program direction, cast, storylines, and production values might vary wildly from one episode to another. A viewer facing this inscrutable mass of media content might decide to ignore it completely and do something else instead. Since the task of content selection is rendered so difficult by the sheer amount of media content and the lack of helpful guidance available, and only a small portion of the content may actually interest the viewer, a quick cost-benefit analysis may reveal that the time and effort spent to select the media content outweighs the rewards of viewership Accordingly, there is a need to overcome the drawbacks and deficiencies in the art by providing a system to allow easy selection and viewing of video media content that interests a viewer, without requiring undue effort from the viewer.

SUMMARY OF THE INVENTION

There are provided systems and methods for visual search in a video media player, substantially as shown in and/or described in connection with at least one of the figures, as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2a and FIG. 2b present diagrams of a user interface for a video media player, according to one embodiment of the present invention;

FIG. 3 presents a diagram of video selection navigational controls, according to one embodiment of the present invention;

DETAILED DESCRIPTION OF THE INVENTION

The present application is directed to a system and method for visual search in a video media player. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1A:
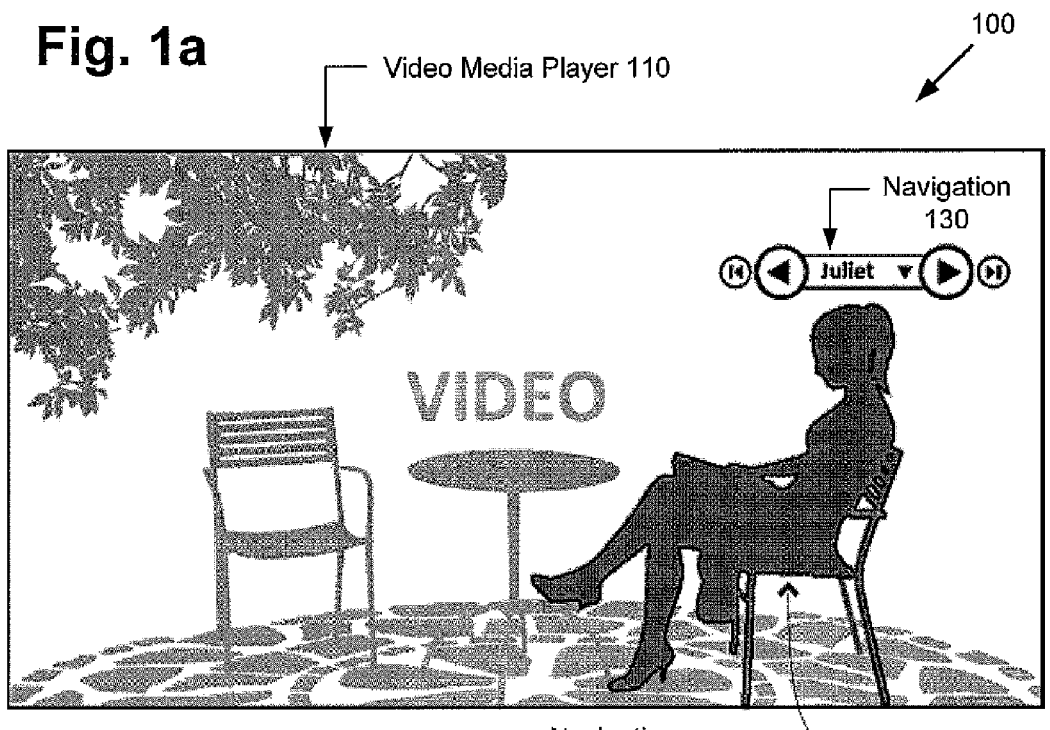
FIG. 1a presents a diagram of a video media player interface, according to one embodiment of the present invention.
Figure 1B:
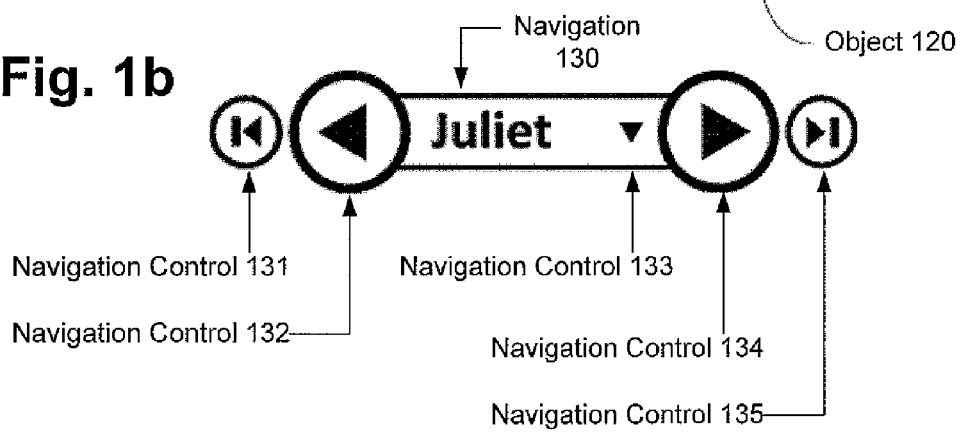
FIG. 1b and FIG. 1c present diagrams of navigational controls, according to one embodiment of the present invention.
Figure 1C:
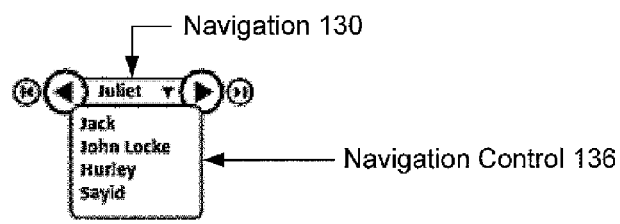

FIG. 1a presents a diagram of a video media player interface, according to one embodiment of the present invention. Video media player interface 100 includes video media player 110, object 120, and navigation 130. FIG. 1b and FIG. 1c present diagrams of navigational controls, according to one embodiment of the present invention. FIG. 1b presents a detailed view of navigation 130, including navigation controls 131, 132, 133, 134, and 135. FIG. 1c presents an expanded view of navigation 130, with the additional element navigation control 136.

Video media player 110 in FIG. 1a depicts the playback of a video with multiple distinct objects. Starting from the left, the leaves of a tree, an empty chair, a table, and a reclining character named Juliet can be visually identified. Although navigation 130 shows the name of the character, it could also be configured to display the real name of the actress instead, based on a user preference or some other setting. As shown in FIG. 1a, Juliet is identified as object 120, highlighted and outlined from the rest of the video frame enclosed by video media player 110. To select Juliet as an object, a user might hover a pointer over Juliet in the video frame, or click on Juliet with a pointing device, such as a mouse or stylus. After such a selecting action is registered, Juliet might be highlighted as shown in FIG. 1. The display of video media player 110 might also be touch-sensitive, whereby a finger touch or tap acts as a pointing device clicking. Clicking on Juliet or hovering the pointer for a predetermined time might further outline Juliet and cause navigation 130 to pop up on top of video media player 110. Although highlighting and outlining are used in this example, other methods of visually identifying the object could be utilized as well, such as zooming, blinking, brightening, or any other contrasting visual technique. The data indicating whether the pointer is within the bounds of an object in a particular video frame might be embedded within metadata that is separately retrieved from the video, or embedded as a data stream within the retrieved media file. Generating the bounds data might be done with an object bounds recognition algorithm, a third party object bounds detection service, or simply by visual estimation with manual or computer assisted correction, Examining FIG. 1b, numerous navigation controls are shown, allowing a viewer to seek, or change the immediate playback position, to search results or scenes that include the object indicated by navigation 130, or Juliet in FIG. 1b. Navigation control 131 allows the viewer to seek to a previous search result featuring Juliet, navigation control 132 seeks to the beginning of the current search result featuring Juliet, navigation control 134 seeks to the end of the current search result featuring Juliet, and navigation control 135 seeks to the next search result featuring Juliet. The navigation controls could also be configured to seek to different media files, if the beginning or the end of the current media file is reached. For example, if the video depicted in FIG. 1a is the first scene featuring Juliet in the second episode of a series, navigation control 131 might seek to the final scene that features Juliet in the first episode of the series. Furthermore, the navigation controls might seek to a completely different program, such as, for example, a late night talk show featuring the actor portraying Juliet as a guest. The navigation controls can be flexibly configured to seek a particular identified object through a desired scope of media breadth.

Not everyone might be a fan of Juliet, so navigation control 133 allows a viewer to select other objects. Activating navigation control 133 might cause navigation control 136 of FIG. 1c to appear, presenting a list of alternative choices. Since Juliet might belong to the "characters" category, navigation control 136 might be configured to only display other "characters," which in FIG. 1c include Jack, John Locke, Hurley, and Sayid. Selecting one of these other characters might cause navigation 130 to change focus to the selected character, and immediately seek forwards or backwards to the nearest search result featuring that character. Since using navigation control 136 may change the currently selected object, a new search may need to be initiated with the newly selected object as a search term. Although navigation control 136 presents a single level menu displaying all characters for simplicity, an alternative embodiment might utilize a multi-level menu to represent multiple sub-categorizations. For example, a top-level menu might provide a selection for male versus female characters, while a secondary menu might provide for a listing of characters on the "blue team" versus a listing of characters on the "red team." The preferred menu navigation complexity might additionally be selectable as a user preference.

Besides Juliet, the other identifiable objects in FIG. 1a can be similarly navigated as well. For example, clicking a pointer over the table in the center of the video frame might cause the table to be highlighted and outlined, and the text of navigation 130 might change to read "Table." Thus, the navigation controls of navigation 130 would allow a viewer to seek to all search results featuring the particular table in the video frame of FIG. 1a. Furthermore, clicking on navigation control 133 might display a navigation control 136 listing all objects in the "Furniture" category, including the empty chair to the left of the video frame and a bed shown in a different scene. Similarly, clicking on the tree to the far left might result in navigation 130 displaying "Tree", and clicking navigation control 136 might list all objects in the "Nature" category, perhaps including an "Ocean" object featured in a beach scene. In this manner, a viewer can quickly and easily navigate to objects of interest as well as objects in related, well-organized categories.

This navigation system could also be applied to other categories of media such as sports footage, for example. Video media player 110 might instead feature a soccer match, and a viewer might be enabled to click on a particular player as an object. Video media player 110 could also be configured to tune into a wide range of sports rather than a single sport, such as various Olympic events, nationwide college sports games, and professional sports tournaments. In this case, particular types or sports, particular teams or countries, or particular sports players might be selected as objects. Since these objects might not be displaying in video media player 110, a list of thumbnails showing the objects might be used for object selection instead. This method of selection from a list of text or thumbnails might be preferable to selecting an object within the video frame of video media player 110, since following and clicking a fast moving sports player might prove to be difficult. If a sports player is selected as an object, the selected "category" might represent the selected player himself, rather than a broader category including multiple players. Thus, if the selected player's name is Pepe, the object list of navigation control 136 might include "Pepe's Dribbling Footage," "Pepe's Goal Shots," and "Pepe's Highlights" as selectable menu objects. Thus, if a viewer is a big fan of Pepe, he can easily view all the scenes where Pepe is controlling the ball by selecting "Pepe's Dribbling Footage," or skip to the exciting scenes by selecting "Pepe's Goal Shots" or "Pepe's Highlights." If, instead of an individual player, a broader category such as "Olympics Highlights" is selected, the offered menu objects of navigation control 136 might include "400 m Swimming Highlights," "Soccer Highlights," and "Javelin Throw Highlights," to enumerate a few. Another category, "Olympics Team USA Gold Medals," might present all the Olympic events in which Team USA earned a Gold Medal. An additional navigation control similar to playlist 241 of FIG. 2b might allow the viewer to queue up some or all of the matching scenes into a playlist for successive playback, one after another. This might be particularly useful in a mobile context, where a viewer can catch the highlights of a particular match, player, team, or sporting event on a mobile viewing device.

Moving to FIG. 2a and FIG. 2b, FIG. 2a and FIG. 2b present diagrams of a user interface for a video media player, according to one embodiment of the present invention. Video media player interface 200 includes video media player 210, user interface 211, search terms 240, and thumbnails 250. Video media player 210 corresponds to video media player 110 of FIG. 1a. FIG. 2b additionally includes object 220, corresponding to object 110 of FIG. 1a, as well as playlist 241 and button 242.

FIG. 2a shows an expanded view of the interface introduced with FIG. 1a, with additional user interface elements surrounding the video frame shown by video media player 210. Thumbnails 250 references seek points at various time offsets of the currently playing video, allowing a viewer to quickly seek through the video by glancing at the thumbnails and clicking on a desired section of the video. Each thumbnail also references a particular segment of video defined by a playback duration, with the starting point equal to the time offset. Visually, the thumbnails might be represented using traditional still frame graphical images, or alternatively with animated preview videos.

By default, the thumbnails might be initially configured to stagger at a periodic interval, with equal and continuous segments. For example, if one minute is chosen as the periodic interval, the first thumbnail might reference time offset 0:00, the second thumbnail might reference time offset 1:00, the third thumbnail might reference time offset 2:00, and so on, until available video segments are exhausted. Each thumbnail also indicates a playback duration of one minute, except possibly the final thumbnail, which may be shorter than one minute if there is insufficient remaining video content.

Various additional navigational controls might extend the functionality of thumbnails 250. For example, should the number of thumbnails exceed the available width of the user interface, scrolling navigational controls might be added to the sides as shown in FIG. 2a, represented by the left and right facing triangles. initiating a scrolling action shifts the visible set of thumbnails left or right. Additionally, a seek bar might indicate the currently selected thumbnail and the seek position within the playback duration defined by the thumbnail. Clicking on a different thumbnail or section of a thumbnail causes the video position and seek bar to move accordingly. In FIG. 2a, the seek bar is implemented as downward and upward facing triangles that fades away thumbnail segments previously played. As indicated by the position of the seek bar in FIG. 2a, the entire first thumbnail and slightly more than half of the second thumbnail have already played so far, as indicated by the faded gray thumbnail frames.

User interface 211 also adds search terms 240 to the left of the video frame. This portion of the user interface allows a user to build a list of objects for a visual search. Rather than typing in a search term, a viewer can simply visually scan the video and click on an object directly within the video, as previously detailed in FIG. 1a. For example, a viewer might click on the "Add Object" command under "Search Criteria," and click on the table in the middle of video media player 210. As a result, "Table" is added to the Search Criteria object list, and the table, object 220, is outlined and highlighted within the video frame, as indicated in FIG. 2b.

At this point, a search is conducted and thumbnails 250 are updated to reflect every thumbnail that matches the search parameters built under the "Search Criteria" list. Since only "Table" is listed, each highlighted thumbnail in thumbnails 250 contains at least one frame featuring the table within the one-minute segment defined by each thumbnail. In FIG. 2b, counting from the left, the second, fourth, ninth, tenth, and twelfth thumbnails all have at least one scene with the table included. Additionally, each scene is populated into playlist 241. Selecting the "Play all" button, button 242, plays the contents of playlist 241 successively. Playlist 241 might also allow flexible addition and removal of scenes. In this manner, a viewer can automatically view all matched scenes without manually selecting each one, potentially saving significant time and hassle for searches with a large number of matched scenes.

Although the structure of thumbnails 250 is kept the same as FIG. 2a in FIG. 2b, the addition of objects in the "Search Criteria" list might cause a reconfiguration of thumbnails 250 to aid in results navigation. For example, a search that returns only results that are outside the scope of the visible thumbnails might automatically scroll the thumbnails such that at least one of the highlighted thumbnails is visible. Alternatively, the thumbnails might be filtered such that only results indicated by highlighted thumbnails are shown, with non-highlighted thumbnails hidden from view. If a search returns only sparse results, or if the search extends to other video files besides the currently playing video, hiding thumbnails unrelated to the search may improve results navigation for the viewer. Once the "Search Criteria" list is reset or the objects are removed, the thumbnails might revert to the default configuration displaying all thumbnails. A context menu accessible from clicking an object in the list might allow for object removal or emptying the list.

When adding objects to "Search Criteria," the list may relate objects using OR operators by default, but the list could be configured to allow for advanced Boolean searching, supporting additional operators such as the AND operator and the NOT operator. For example, the plus sign designation "+" could represent the OR operator, whereas an "X" could represent the NOT operator and an ampersand "&" could represent the AND operator. These Boolean operators might be selectable by clicking on the operator symbol to the left of an object name to reveal a drop down menu allowing selection of a different operator. Order of operators might also be managed by object text indentation and drop down menus.

Moving to FIG. 3, FIG. 3 presents a diagram of video selection navigational controls, according to one embodiment of the present invention. Video selection navigational controls interface 300 includes user interface 311, which contains thumbnails 350 and search box 360. If a viewer has not yet decided on a particular media file to play, a user interface for video media playback might be premature. It may thus be desirable to reserve a larger amount of display area for the display of several thumbnails, giving the viewer a broader overview of available video content to facilitate searching and selecting a video for viewing. Alternatively, the user interface 311 might be launched from a video media player to allow a broader search that may be unrelated to the currently playing video.

Search box 360 allows a viewer to type in desired terms for searching, such as the name of a character, an actor, the title of a program, or other search criteria. Clicking on an interface element or pressing a confirmation key such as the Enter key on a connected keyboard might manually initiate the search. Alternatively, the search might be conducted automatically as the user types or after a period of inactivity. Search box 360 might be flexibly configured to allow additional features such as auto-complete, previous search history, selection of text from preconfigured lists, support for Boolean operators, and fuzzy searching. Search box 360 might be replaced or supplemented with an object selector, such as a navigation bar featuring thumbnail images or preview videos of current programming or popular characters and actors. Once a particular search is confirmed, matching thumbnails are highlighted while non-matching thumbnails are dimmed as shown in thumbnails 350.

The example shown in FIG. 3 indicates that the search term of search box 360 is "Kate", so each highlighted thumbnail in thumbnails 350 should include at least one video frame featuring the "Kate" character or actress. Each thumbnail can vary in length, from a short scene to a full episode, depending on the parameters of the search. Additional navigational tools might be included to allow for search customization and filtering, such as restricting search terms to character names or actor names only, or restricting searches to only a particular program versus all available content. Additionally, as discussed with thumbnails 250 in FIG. 2b, thumbnails 350 in FIG. 3 might be configured to hide the dimmed non-matching thumbnails to further emphasize the matching thumbnails, and restore the display of all thumbnails after search box 360 is cleared. In this manner, a viewer can quickly access desired content by submitting a search, visually scanning the matching thumbnails, and selecting a desired video result.

Figure 4:
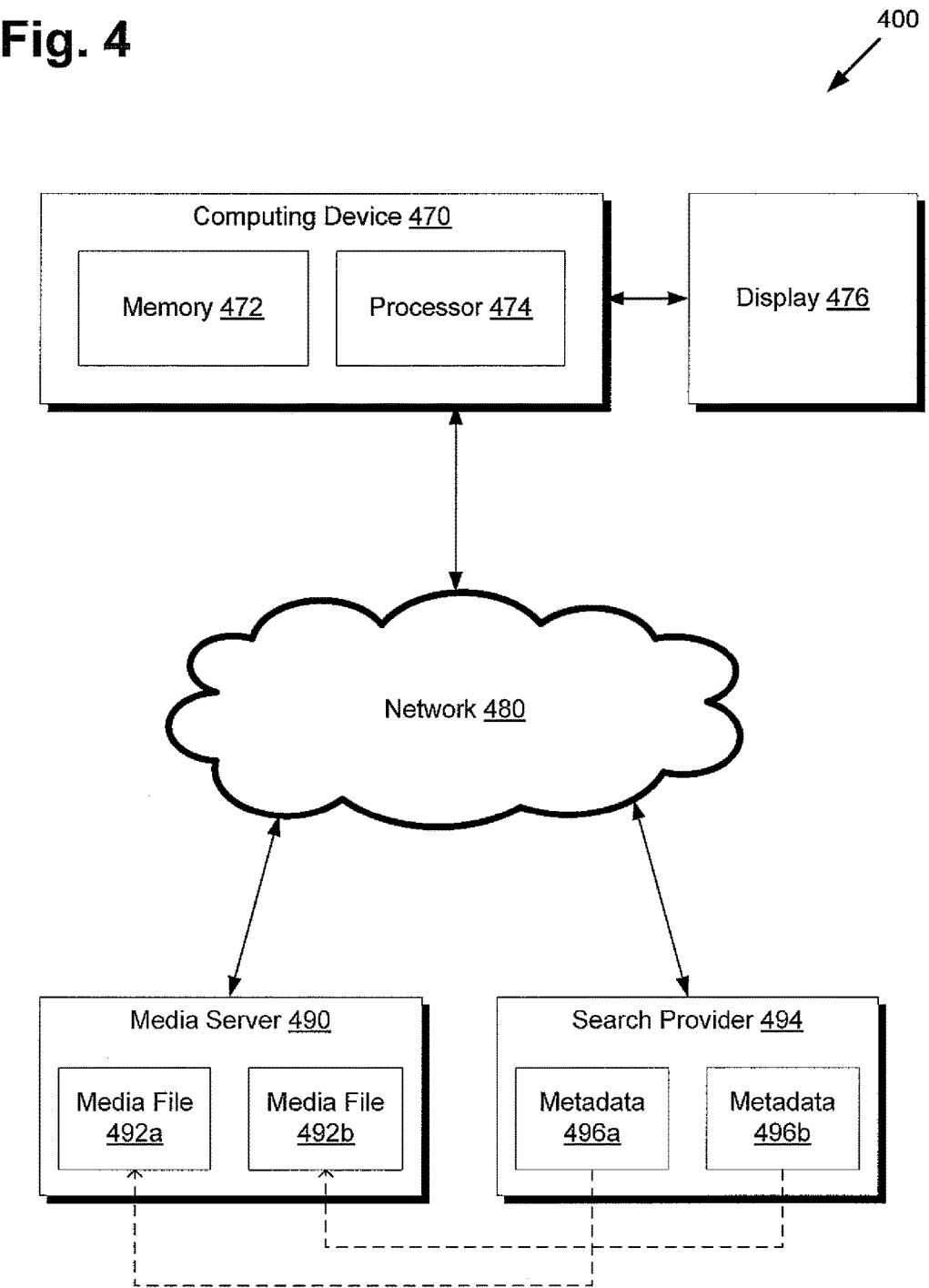
FIG. 4 presents a block diagram of a media network, according to one embodiment of the present invention.

Moving to FIG. 4, FIG. 4 presents a block diagram of a media network, according to one embodiment of the present invention. Network environment 400 includes computing device 470, display 476, network 480, media server 490, and search provider 494. Computing device 470 includes memory 472 and processor 474, and can display video through a connected display 476. Media server 490 includes media files 492a and 492b. Search provider 494 includes metadata 496a describing media file 492a and metadata 496b describing media file 492b. Network 480 provides data communications between computing device 470, media server 490, and search provider 494.

FIG. 4 demonstrates an example environment in which the previously described user interfaces might operate, placing the user interfaces within the context of some implementing hardware and supporting data sources. For example, a content producer might maintain a web-based video streaming service from media server 490, streaming video files to the public. Only two media files, media file 492a and 492b, are shown in FIG. 4 to simplify the discussion. In real world conditions, a media server might include many media files. Similarly, search provider 494 in FIG. 4 only contains the metadata required to service media files from media server 490, but search provider 494 might also provide search metadata services for other servers and media files. Additionally, multiple search providers might be used to service particular categories of searches. For example, one search provider might only provide simple text metadata such as keyword tags, whereas another search provider might specialize in facial recognition for detection of people, and yet another search provider might specialize in detection of inanimate objects. Thus, the metadata might include numerous different data representations such as text strings for textual metadata, pixel bitmasks and coordinate sets for object bounding, images and video clips for thumbnails, and other data sets. Multiple search providers might also be used to load balance search requests across multiple servers to improve performance and user concurrency.

Computing device 470 represents the hardware the viewer may use to view the media files. A few examples of such devices might include a desktop or notebook computer, a mobile phone, a portable gaming system, or a smart-phone. Memory 472 might be a dynamic random access (DRAM) chip, a hard disk drive (HDD), or some other storage medium accessible to processor 474 for future retrieval. Processor 474 executes program logic for operating computing device 470. If computing device 470 comprises a desktop computer system, it might be connected to an external display 476 as shown in FIG. 4, but integrated solutions such as notebook computers might integrate display 476 within computing device 470. A wired or wireless connection to network 480, which might represent the Internet, provides data communications to and from supporting data sources.

For example, the viewer at computing device 470 might decide to access the website hosted by media server 490. After a connection is established, computing device 470 might receive a user interface program with an appearance similar to FIG. 1a into memory 472 and execute the user interface using processor 474, thereby displaying the user interface onto display 476. Peripherals such as a mouse and a keyboard connected to computing device 470 or a touch sensitive display 476 might enable interaction with the user interface. After the user interface loads, the viewer might select media file 492a for playback, in which case processor 474 might request streaming of media file 492a from media server 490 and corresponding metadata 496a from search provider 494. If the viewer initiates a search request, the request may be forwarded to search provider 494 for processing and results retrieval.

It should be appreciated that FIG. 4 only presents one possible configuration for presenting the user interface to the viewer. In alternative embodiments, the functions of media server 490 and search provider 494 might be consolidated into one centralized location, where metadata 496a is embedded within media file 492a and metadata 496b is embedded within media file 492b. The system might also run in a non-networked environment, providing a local user interface to a Digital Versatile Disc (DVD) changer directly connected to the computing device, for example. This would allow a viewer to search through their personal movie collection using the above described user interface, assuming the metadata can somehow be generated or preloaded into the user interface. Alternatively, the DVD changer may be network connectable, retrieving search metadata from a search provider having metadata for commercially released DVD videos.

The user interfaces described above could be applied to a number of different situations, and is not limited to only streaming video over a network. Besides Internet streaming video applications, the visual search interface could be applied to television and video on demand services, online video download storefronts, DVD and Blu-ray players, and video capable mobile devices such as smartphones, PDAs, and portable media players. Any video playback capable device is a valid candidate for enhancement with the visual search interface, allowing quick and flexible retrieval of desired content. Additionally, the visual search is not limited to strictly consumer applications, as video production and editing facilities may find the visual search to be useful for expediting workflows. For example, particular editors might be assigned to review footage of particular actors' performances for efficient division of editing workloads, or video editors might be interested in the entrance or exit of a particular actor from a particular scene. Quickly focusing on the relevant footage may be easily accomplished using the visual search interface, which might be integrated as a plug-in for an industry standard video-editing suite.

Figure 5:
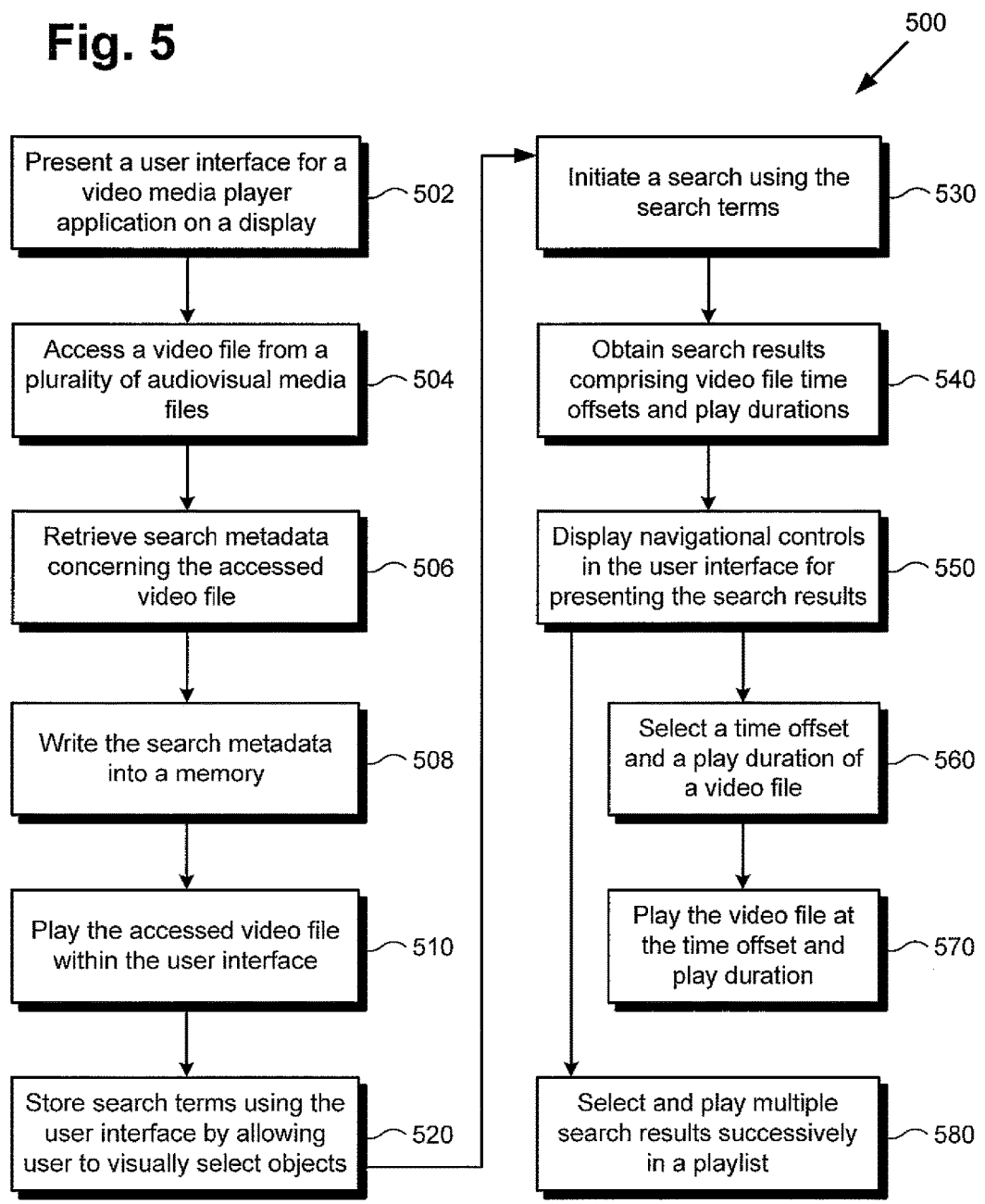
FIG. 5 shows a flowchart describing the steps, according to one embodiment of the present invention, by which a computing device can provide visual search in a video media player.

Moving to FIG. 5, FIG. 5 shows a flowchart describing the steps, according to one embodiment of the present invention, by which a computing device can provide visual search in a video media player. Certain details and features have been left out of flowchart 500 that are apparent to a person of ordinary skill in the art. For example, a step may comprise one or more substeps or may involve specialized equipment or materials, as known in the art. While steps 502 through 580 indicated in flowchart 500 are sufficient to describe one embodiment of the present invention, other embodiments of the invention may utilize steps different from those shown in flowchart 500.

Referring to step 502 of flowchart 500 in FIG. 5 and network environment 400 of FIG. 4, step 502 of flowchart 500 comprises computing device 470 presenting a user interface for a video media player application on display 476. As previously discussed, a user interface program might be retrieved from media server 490 over network 480, to be stored into memory 472 for execution by processor 474. Once the user interface program is executing on processor 474, the visual portion of the user interface outputs to display 476, which might resemble the depiction shown in FIG. 2a. As mentioned, attached peripherals such as a mouse, keyboard, or touch sensitive screen might accept input from the viewer for interactivity with the user interface.

Referring to step 504 of flowchart 500 in FIG. 5 and network environment 400 of FIG. 4, step 504 of flowchart 500 comprises computing device 470 accessing a video file from a plurality of audiovisual media files hosted at media server 490. As previously mentioned, the plurality of audiovisual media files includes only two files, media files 492a and 492b, to simplify the discussion. For the purposes of the discussion, media file 492a might be the particular video file accessed by computing device 470.

Referring to step 506 of flowchart 500 in FIG. 5 and network environment 400 of FIG. 4, step 506 of flowchart 500 comprises computing device 470 retrieving metadata 496a including search object data for identifying objects within media file 492a accessed from step 504. Although in FIG. 4, metadata 496a is located in search provider 494, metadata 496a might alternatively be embedded as stream data within media file 492a, as previously discussed. Metadata 496a allows processor 474 to identify the bounds for particular identified objects within video frames in media file 492a. The search object data might be implemented using pixel bitmasks, an N-sided polygon defining the object in coordinates, or some other data structure that can represent the object boundaries.

Referring to FIG. 2a, if the video depicted in video media player 210 is media file 492a, the search object data from metadata 496a may allow processor 474 to identify the tree, the chair, the table, Juliet, and off-screen but identifiable objects such as the ocean or Jack against the remainder of the video frame, not only at the position indicated by the seek bar but throughout the entire video. Thus, all identifiable objects need to be tracked for every relevant frame in the video, which might consume a considerable amount of data storage. To alleviate this problem, metadata 496a might be delivered in a compressed format, just as media file 492a might also be delivered in a compressed format. Should a loss less compression format still remain too large for network 480 to cope, some amount of bounds precision might be sacrificed to improve the data compression ratio.

Referring to step 508 of flowchart 500 in FIG. 5 and network environment 400 of FIG. 4, step 508 of flowchart 500 comprises computing device 470 writing metadata 496a into memory 472. This step is done so that processor 474 can properly identify objects in response to some future user interaction within the presented user interface from step 502. Otherwise, processor 474 may need to constantly query search provider 494 for metadata 496a, as there is no location to store the metadata.

Referring to step 510 of flowchart 500 in FIG. 5 and network environment 400 of FIG. 4, step 510 of flowchart 500 comprises computing device 470 playing the accessed media file 492a within the user interface presented in step 502. This step might be initiated automatically by processor 474 upon sufficient buffering of media file 492a, as is common convention for video media players. Alternatively, this step may not activate until the viewer manually initiates a playback control, or an intervening advertising segment might appear before the requested content begins playing. Once this step is initiated, the video in video media player 210 may begin to play, with the seek bar at thumbnails 250 following the location of playback.

Referring to step 520 of flowchart 500 in FIG. 5 and network environment 400 of FIG. 4, step 520 of flowchart 500 comprises computing device 470 storing one or more search terms in memory 472 using the user interface from step 502 by allowing a user to visually select objects as search terms, the objects corresponding to the one or more search terms. The interface of this step might resemble FIG. 3, with an additional navigational bar for visually selecting objects of interest, such as thumbnail images of current programming or popular characters and actors, as previously discussed. If an interface similar to FIG. 3 is used, step 520 might represent an alternative entry point for flowchart 500, since the viewer may not have yet chosen a video file for playback yet. Alternatively, this step might look more like FIG. 2a, allowing a viewer to build an advanced search with multiple objects and different Boolean operators, as also previously discussed. Since FIG. 2a depicts a video file already in the process of playback, steps 502 through 510 may have been already completed in the representation shown by FIG. 2a. In either case, after step 520 is completed, search terms forming a search query will be ready for submission.

Referring to step 530 of flowchart 500 in FIG. 5 and network environment 400 of FIG. 4, step 530 of flowchart 500 comprises computing device 470 initiating a search with the search terms built in step 520. In the present example, this is accomplished by querying search provider 494 with the search terms. This query may be carried over network 480 in FIG. 4, but as previously mentioned, FIG. 4 is only one exemplary configuration. The query might alternatively be carried over a directly connected search provider. Furthermore, should advances in image recognition techniques render the detection of objects within video frames feasible in real-time on consumer level processors, computing device 470 might serve as a local search provider for itself, rather than relying on pre-calculated data from external sources.

Referring to step 540 of flowchart 500 in FIG. 5 and network environment 400 of FIG. 4, step 540 of flowchart 500 comprises computing device 470 obtaining search results comprising one or more time offsets and corresponding play durations within the one or more video files held by media server 490, each play duration containing at least one frame corresponding to the search terms submitted in step 530. Before step 540 can be completed, search provider 494 implicitly matches the submitted search terms against metadata 496a and possibly metadata 496b, depending on the desired scope of the search. Once this implicit step is completed, the search results can be returned to computing device 470. One possible data format that might be used is a simple list of value sets, each value set including a reference to a media file, a time offset in the media file, and a playback duration indicating the matched scene length.

Each value set above should reference at least one frame of video matching the requested search terms, or the received value sets will be meaningless hits irrelevant to the search. However, the scenes might include some amount of unmatched buffer time to prevent the results from becoming excessively fragmented. This scene fragmentation might happen, for example, if a search for a particular character searches through video footage with the character appearing on and off the screen rapidly, as might happen in a conversation with another character, where the video camera changes focus from speaker to speaker. With a sufficient video buffer, this conversation might be retrieved as a single continuous scene, rather than as multiple scenes with jarring starts and cutoffs.

Referring to step 550 of flowchart 500 in FIG. 5 and network environment 400 of FIG. 4, step 550 of flowchart 500 comprises computing device 470 displaying navigational controls in the user interface of step 520 for presenting the search results received from step 540, including selectable graphical thumbnail images or preview videos. These navigational controls might resemble thumbnails 250 of FIG. 2b or thumbnails 350 of FIG. 3. Besides presenting thumbnails to the user as navigational controls for selection, seek controls similar to navigation 130 of FIG. 1b might also be presented to the user. As previously discussed, navigation 130 allows flexible seeking to a previous and a next search result, as well as a beginning and an end of a current search result, the search results sourced from step 540.

The thumbnails of step 550 might be generated on the fly, or pre-generated and stored by media server 490 or search provider 494. Traditional still frame graphical images might be used for the thumbnails, or alternatively, animated preview videos might provide for a broader overview of each associated scene, at the possible expense of additional processing and storage requirements. Whichever particular interface is presented, the viewer will be able to view and select from the results for playback. Additionally, when preparing the navigational controls, the search results received from step 540 might undergo data transformations to facilitate presentation of the search results.

For example, referring to FIG. 2a, a user interface designer might deem that partially shaded thumbnails is poor layout design, so each thumbnail should ideally be completely shaded or not shaded at all. Each thumbnail might represent a single minute of video, but the retrieved value sets might not be formatted exactly on one-minute boundaries. In this case, the search results might be transformed so that the time offsets and playback lengths of the search results always fill entire thumbnails. Alternatively, thumbnails 250 might be configured to always display fully shaded thumbnails, but playback operations may only play the portion indicated by the playback length of the original search results. Each example user interface presented so far provides for a different emphasis in navigation style. FIG. 1a provides for a highly organized, categorical, and hierarchical results browsing experience, but makes it difficult to browse among multiple results, since the navigational controls only provide for next and previous results. FIG. 2b provides for efficient searching within a currently playing video, but may be less appropriate for searching across multiple videos. FIG. 3 allows a viewer to view a large amount of results at a single time, but may overwhelm the viewer with tangential and unwanted results. In the end, the user interface might allow the user to change the particular view configuration on demand, combining the strengths of each approach.

After step 550, all that remains is for one or more of the results to be played back, depending on the desires of the viewer. As previously discussed in the soccer game search example, a feature for playing some or all of the results sequentially might be offered and selected by the viewer, causing step 580 to initiate as further detailed below. The viewer might also just select a single result, causing step 560 to initiate as further detailed below. Alternatively, the viewer might also decide that the search results are not helpful or that recreation time is over, in which case the viewer will simply stop after step 550, or return to a previous step such as step 520 or step 502 to try a different approach.

Referring to step 560 of flowchart 500 in FIG. 5 and network environment 400 of FIG. 4, step 560 of flowchart 500 comprises computing device 470 selecting a time offset and a play duration of a video file based on user interaction with the selectable graphical thumbnail images or preview videos in the navigational controls presented in step 550. In FIG. 2b for example, if the viewer decides to click on the second matched thumbnail within thumbnails 250, or the fourth thumbnail from the left, step 560 would select the time offset and play duration represented by the fourth thumbnail, which might be time offset equal to "4:00" or four minutes and play duration of "0:30" or thirty seconds. The currently playing video file would also be referenced, which might be media file 492a.

Referring to step 570 of flowchart 500 in FIG. 5 and network environment 400 of FIG. 4, step 570 of flowchart 500 comprises computing device 470 initiating playback with the parameters selected from step 560 in the user interface of step 520. Continuing with the example from the previous step, this would comprise playback of media file 492a at time position "4:00" or four minutes for the playback duration of "0:30" or thirty seconds. As previously discussed, the results might be transformed to conform to the one minute boundaries of thumbnails 250 in FIG. 2b, in which case the playback duration would be extended to "1:00" or one minute. Alternatively, only the display of thumbnails 250 might depict fully shaded thumbnails, with the actual playback durations unaffected. After step 570 is completed, the viewer might return to step 560 to view other matched results.

Referring to step 580 of flowchart 500 in FIG. 5 and network environment 400 of FIG. 4, step 580 of flowchart 500 comprises computing device 470 selecting and playing multiple visual search results from step 540 successively in a playlist within the user interface of step 520. This step has already been discussed in some detail in conjunction with the soccer game example, but FIG. 2b also provides a good example for step 580. An additional navigation element placed below the thumbnails, a "Play all" button, might be introduced, allowing sequential playback of all matched results. Thus, assuming there are no off-screen matches, from the left, the results corresponding to thumbnail two, four, nine, ten, and twelve would all be queued and played back if the "Play all" button is selected by the viewer. Alternatively, there might be a playlist where a viewer can drag multiple desired results into the playlist for sequential playback.

As part of the advantages of various embodiments of the present invention, a viewer of video media content is enabled to easily search through a large quantity of video media content, a task that might otherwise require enormous amounts of effort and resources in research. This ease of access to content that interests the viewer encourages the viewer to increase his consumption of video media, allowing the viewer to more efficiently spend his limited leisure time, while benefitting media providers with better viewer retention and more satisfied customers, which may increase media sales, generate positive publicity, and boost advertising revenue.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangements, modifications, and substitutions without departing from the scope of the invention.

What is claimed is:

1. A method for use by a video media player interface of a video search system having a memory and a processor, the method comprising:
   displaying, using the processor, a video content containing a plurality of selectable video objects in the video media player interface and displaying a thumbnail structure having a plurality of thumbnails corresponding to a plurality of scenes in the video content, wherein search object data for identifying each of the plurality of selectable video objects from the video content is stored in the memory as search metadata;
   receiving, from a viewer, a selection of first one of the plurality of selectable video objects, wherein the selection by the viewer is made directly from the video content being displayed;
   identifying, from the search metadata in the memory, the search object data corresponding to the selected first one of the plurality of selectable video objects;
   highlighting, in response to identifying the selected first one of the plurality of selectable video objects, one or more thumbnails of the plurality of thumbnails in the thumbnail structure, wherein the highlighted one or more thumbnails include the selected first one of the plurality of selectable video objects;
   receiving, from the viewer, a selection of a thumbnail from the highlighted one or more thumbnails including the selected first one of the plurality of selectable video objects; and
   displaying, in response to receiving the selection of the thumbnail from the highlighted one or more thumbnails, the scene in the thumbnail including the selected first one of the plurality of selectable video objects.

2. The method of claim 1 further comprising:
   displaying in the navigation, in response to identifying the selected first one of the plurality of selectable video objects, a name of selected first one of the plurality of selectable video objects.

3. The method of claim 2, wherein the selected first one of the plurality of selectable video objects is a movie character, and wherein a user preference determines whether the displayed name is a character name of the movie character in a movie or is a real name of the movie character.

4. The method of claim 1 further comprising:
   receiving, from the viewer, a selection of second one of the plurality of selectable video objects, wherein the selection of the second one by the viewer is made directly from the video content being displayed; and
   identifying, from the search metadata in the memory, the search object data corresponding to the selected second one of the plurality of selectable video objects;
   wherein the highlighting highlights the one or more thumbnails that include both the selected first one of the plurality of selectable video objects and the selected second one of the plurality of selectable video objects.

5. A video search system comprising:
   a memory; and
   a processor configured to:
      display a video content containing a plurality of selectable video objects in the video media player interface and display a thumbnail structure having a plurality of thumbnails corresponding to a plurality of scenes in the video content, wherein search object data for identifying each of the plurality of selectable video objects from the video content is stored in the memory as search metadata;
      receive, from a viewer, a selection of first one of the plurality of selectable video objects, wherein the selection by the viewer is made directly from the video content being displayed;
      identify, from the search metadata in the memory, the search object data corresponding to the selected first one of the plurality of selectable video objects;
      highlight, in response to identifying the selected first one of the plurality of selectable video objects, one or more thumbnails of the plurality of thumbnails in the thumbnail structure, wherein the highlighted one or more thumbnails include the selected first one of the plurality of selectable video objects;
      receive, from the viewer, a selection of a thumbnail from the highlighted one or more thumbnails including the selected first one of the plurality of selectable video objects; and
      display, in response to receiving the selection of the thumbnail from the highlighted one or more thumbnails, the scene in the thumbnail including the selected first one of the plurality of selectable video objects.

6. The video search system of claim 5, wherein the processor is further configured to display in the navigation, in response to identifying the selected first one of the plurality of selectable video objects, a name of selected first one of the plurality of selectable video objects.

7. The video search system of claim 6, wherein the selected first one of the plurality of selectable video objects is a movie character, and wherein a user preference determines whether the displayed name is a character name of the movie character in a movie or is a real name of the movie character.

8. The video search system of claim 5, wherein the processor is further configured to:
   receive, from the viewer, a selection of second one of the plurality of selectable video objects, wherein the selection of the second one by the viewer is made directly from the video content being displayed; and
   identify, from the search metadata in the memory, the search object data corresponding to the selected second one of the plurality of selectable video objects;
   wherein the highlighting highlights the one or more thumbnails that include both the selected first one of the plurality of selectable video objects and the selected second one of the plurality of selectable video objects.

9. A method for use by a video media player interface of a video search system having a memory and a processor, the method comprising:
   displaying, using the processor, a video content containing a plurality of selectable video objects in the video media player interface and displaying a thumbnail structure having a plurality of thumbnails corresponding to a plurality of scenes in the video content, wherein search object data for identifying each of the plurality of selectable video objects from the video content is stored in the memory as search metadata;
   receiving, from a viewer, a selection of first one of the plurality of selectable video objects, wherein the selection by the viewer is made directly from the video content being displayed;
   identifying, from the search metadata in the memory, the search object data corresponding to the selected first one of the plurality of selectable video objects;

highlighting, in response to identifying the selected first one of the plurality of selectable video objects, one or more thumbnails of the plurality of thumbnails in the thumbnail structure, wherein the highlighted one or more thumbnails include the selected first one of the plurality of selectable video objects; and displaying in the navigation, in response to identifying the selected first one of the plurality of selectable video objects, a name of selected first one of the plurality of selectable video objects;

wherein the selected first one of the plurality of selectable video objects is a movie character, and wherein a user preference determines whether the displayed name is a character name of the movie character in a movie or is a real name of the movie character.

10. The method of claim 9 further comprising:

receiving, from the viewer, a selection of second one of the plurality of selectable video objects, wherein the selection of the second one by the viewer is made directly from the video content being displayed; and identifying, from the search metadata in the memory, the search object data corresponding to the selected second one of the plurality of selectable video objects;

wherein the highlighting highlights the one or more thumbnails that include both the selected first one of the plurality of selectable video objects and the selected second one of the plurality of selectable video objects.

* * * * *